US006925494B1

(12) United States Patent
Nisbet (10) Patent No.: US 6,925,494 B1
(45) Date of Patent: Aug. 2, 2005

(54) METHOD AND APPARATUS FOR OPTICAL NETWORK MAINTENANCE TOOL

(75) Inventor: Alan D. Nisbet, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 803 days.

(21) Appl. No.: 09/746,013

(22) Filed: Dec. 26, 2000

(51) Int. Cl.[7] ............................................. G06F 15/173
(52) U.S. Cl. ...................................... 709/223; 370/254
(58) Field of Search ................ 709/223; 370/254–258; 398/25

(56) References Cited

U.S. PATENT DOCUMENTS

| | | | | |
|---|---|---|---|---|
| 5,513,171 A | * | 4/1996 | Ludwiczak et al. | 370/254 |
| 6,205,122 B1 | * | 3/2001 | Sharon et al. | 370/254 |
| 6,347,336 B1 | * | 2/2002 | Song et al. | 709/223 |

* cited by examiner

Primary Examiner—Mehmet B. Geckil
(74) Attorney, Agent, or Firm—Jeffrey M. Measures; Borden Ladner Gervais LLP (57) ABSTRACT

Embodiments of the present invention provide a tool for maintaining and analyzing portions of an optical network. In some embodiments, a tool is provided that provides a map of sections of an optical network. Additionally, details on the performance and operations of the network elements forming a section of an optical network may also be provided. Embodiments of the invention may collect and use performance and operation statistics which were collected by network elements for other purposes. An algorithm collates the collected data to generate a map of optical links of an optical network. Through use of the map, data structures providing detailed information about the network can be populated. Embodiments of the invention provide a maintenance and analysis tool which may enable optical network administrators to save time, effort and costs and provide increased customer satisfaction.

27 Claims, 6 Drawing Sheets

| 500 |
| --- |

| NE ID (502) | MDR CPG (504) | MDR CONFIGURATION (506) | |
| --- | --- | --- | --- |
| 202A | G2 | POST | 508A |
| 202B | G0 | MSA PRE | 508B |
| 202B | G2 | MSA POST | 508C |
| 202C | G0 | MSA PRE | 508D |
| 202C | G2 | MSA POST | 508E |
| 202D | G0 | PRE | 508F |
| ⋮ | ⋮ | ⋮ | 508i |

METHOD AND APPARATUS FOR OPTICAL NETWORK MAINTENANCE TOOL

BACKGROUND OF THE INVENTION

1. Field of Invention

The present invention relates to optical networks and, more particularly, to methods and apparatus for the maintenance and analysis of an optical network.

2. Description of Related Art

Due to increased data traffic over public and private networks, fuelled in part by the rapid acceptance and reliance on the public Internet and the world wide web, the deployment of optical networks or optical network links has increased substantially. Further, due to the large bandwidth that is provided by these networks, any circumstance which detrimentally affects network performance will, in most instances, affect a tremendous amount of data. Additionally, due to the increased use of networking and data communication in general, users have developed an increased reliance on network availability. Moreover, users of data networks, including users of optical networks, have increasingly become less tolerant of any performance degradation or network down time.

With the increased deployment and use of optical networks comes an increased need for maintenance of these networks. The types of maintenance may include, for example, the need to assess a network's performance, troubleshooting, etc.

In many optical networks, maintenance and network performance assessment is performed manually. While a list of the network components or elements forming an optical network are typically known, the performance and configuration of each network element, which may change over time, is generally difficult to obtain. Current techniques to determine optical network performance and configuration require a high degree of understanding of the network's operations and methodology. Additionally, as a result of manual steps required to gather, format and validate statistics collected for an optical network, there is a tremendous opportunity for errors to result. Moreover, manually performing these operations is extremely time consuming. It is estimated that analyzing an optical network comprising a forty (40) element ring may require approximately forty hours of time. As a result, this manual procedure of network analysis and maintenance is often unacceptable for a variety of reasons: the cost in time and money is too high, customers or users of the network usually require a quicker response and the quality of the analysis is often suspect due to the likelihood of errors caused by manually performing the analysis.

Additionally, due to difficulties in locating and employing qualified personnel to perform such maintenance and analysis, required or desired maintenance is often delayed or not performed. Moreover, without robust and accurate analysis, it is extremely difficult to "tune" or optimize an optical network for a customer.

Use of specially designed monitoring software which could be installed at each network element has been considered. However, use of such software may detrimentally impact the operation of the element itself. Moreover, the installation and maintenance of such monitoring software at each element in a network may result in additional maintenance and cost requirements.

Accordingly, it would be desirable to provide an optical network maintenance tool which addresses at least some of these shortcomings.

SUMMARY OF THE INVENTION

Advantageously, embodiments of the present invention provide an optical network maintenance tool which provides identification of elements forming parts of the network and, through utilization and analysis of data collected from each network element, an analysis of system configuration and performance can be provided.

Network elements, in many instances, individually collect data regarding optical fiber terminating at the network element. Embodiments of the present invention retrieve portions of the data collected in the normal course by network elements. This retrieved data may then be processed by embodiments of the present invention to generate a map of portions of an optical network. This map can then be populated with additional data relating to network element configuration and performance statistics of the optical fibers which terminate at the network element. This map can then be used by a wide variety of personnel in assessing the maintenance and operations of the mapped portions of the optical network.

In one aspect of the invention there is provided a method of mapping an optical network. The optical network comprising a plurality of network elements (NEs), some adjacent pairs of NEs of the plurality of NEs communicating using optical fibers and one or more of the some adjacent pairs forming optical links. The method comprising: identifying NEs which, together with optical fibers therebetween, form an optical link; organizing statistical data retrieved from each identified NE into a map which corresponds to the physical layout of the optical link.

In a further aspect of the invention there is provided a method for facilitating management of an optical network. The method comprising: over a network, querying a plurality of NEs for identification information; and correlating the identification information to identify NEs communicating over an optical link.

In a further aspect of the invention there is provided a computer readable medium operable to provide instructions for directing a processor to map a portion of an optical network. The instructions directing the processor to: identify NEs which, together with optical fibers therebetween, form an optical link; organize statistical data retrieved from each identified NE into a map which corresponds to the physical layout of the optical link.

In a further aspect of the invention there is provided an apparatus for generating a map of a portion of an optical network. The optical network comprising a plurality of network elements (NEs), some adjacent pairs of NEs of the plurality of NEs communicating using optical fibers and one or more of the some adjacent pairs forming optical links. The apparatus comprising: memory adapted to store computer readable instructions and code; a network interface adapted to communicate with a data network; a processor in communication with the memory and the network interface, the processor adapted to retrieve and execute the instructions and code from the memory adapting the processor to: identify NEs which, together with optical fibers therebetween, form an optical link; and organize statistical data retrieved from the NEs identified using the network interface into a map which corresponds to the physical layout of the optical link.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be more clearly understood with reference to the following detailed description read in conjunction with the drawings, in which.

DETAILED DESCRIPTION

Figure 1:
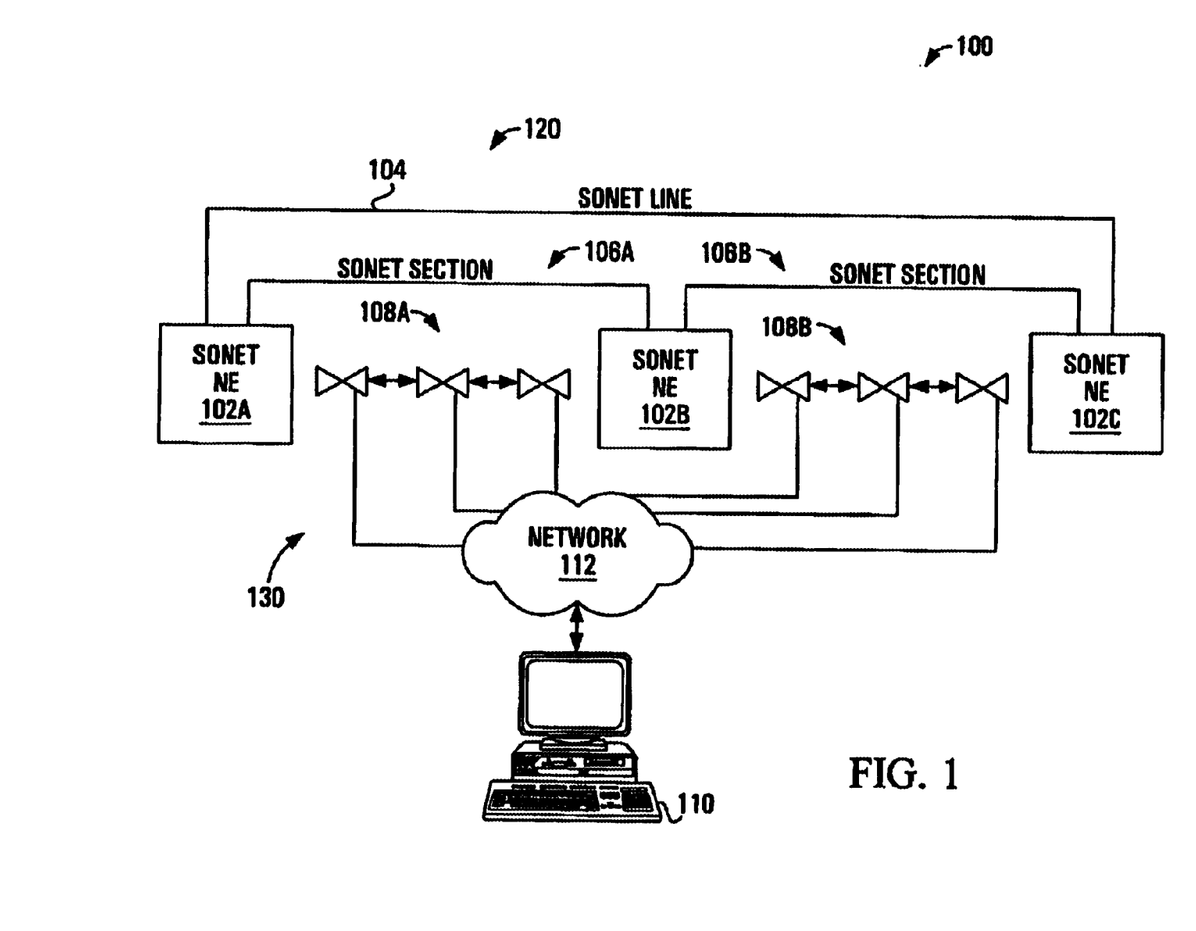
FIG. 1 is a schematic illustration of a portion of an optical network embodying aspects of the present invention.

Illustrated in FIG. 1 is optical network 100 which embodies aspects of the present invention. Optical network 100 includes a Synchronized Optical NETwork (SONET) portion 120 and an Optical Service Channel (OSC) portion 130. As persons of ordinary skill in the art are aware, network elements (NEs) forming part of the SONET layer are generally unaware of the OSC layer, and vice versa. SONET network 120 includes various SONET lines 104 and SONET section 106 (two such sections, 106A and 106B, are illustrated). SONET lines 104 and sections 106 enable communication between SONET NEs 102 (three such NEs being illustrated—102A, 102B and 102C).

OSC network 130 includes optical links 108 (two such links, 108A an 108B, are illustrated) and computer terminal 110. As illustrated in FIG. 1, computer 110 communicates with portions of links 108 through network 112. Network 112 may be a conventional data network such as, for example, a public internet, private internet, Ethernet, WAN, LAN or Public Switched Telephone Network (PSTN).

An OSC transmits a data communications channel (DCC) to NEs that do not process SONET overhead. The OSC also provides orderwire and power optimizer functionality and, in some instances, allows remote access for Operations, Administration, Maintenance and Provisioning (OAM&P) activities.

Communication between computer terminal 110 and an individual OSC NE of optical link 108 may use conventional networking protocols such as telnet, Ethernet, IP or the like. In the exemplary embodiment of FIG. 1 computer terminal 110 communicates over a conventional PSTN using a modem. Alternatively, computer terminal 110 may connect directly to an OSC NE using, for example, serial communication.

Figure 2:
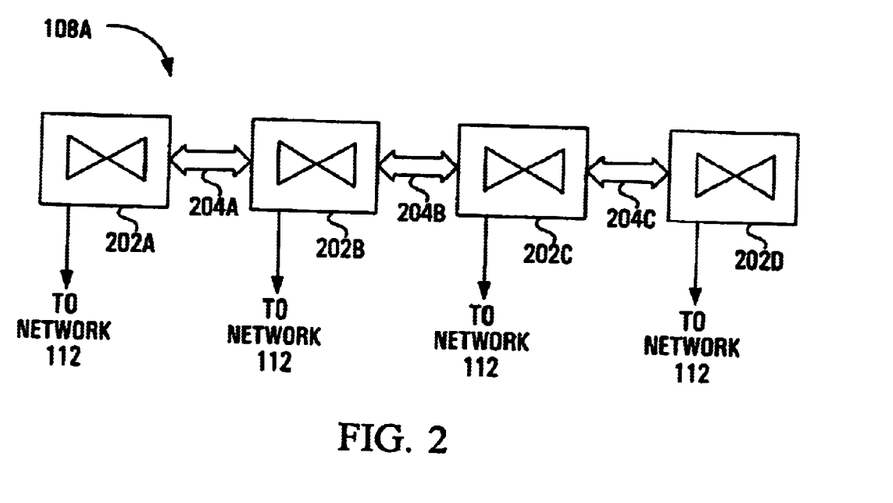
FIG. 2 is a schematic illustration of a portion of FIG. 1.

An exemplary optical link—optical link 10A—is illustrated in greater detail in FIG 2. Optical link 108A includes a number of NEs communicating over the OSC. These OSC NEs 202 (four are illustrated in FIG. 2—202A, 202B, 202C and 202D) are in communication using optical fibers 204 (three optical fiber segments are illustrated—204A, 204B and 204C). Optical link 108A is illustrated as having only a single optical fiber 204 for communication between adjacent OSC NEs 202. However, as those of ordinary skill in the art will appreciate, many optical links 108 are provisioned with two optical fibers connecting adjacent OSC NEs 202. Tpically, in such a configuration, two optical fibers 204 are provisioned between adjacent OSC NEs 202 to provide a level of redundancy. In the description herein, the optical links 108 described herein include only a single fiber between adjacent OSC NEs 202. However, embodiments of the invention are equally applicable to adjacent OSC NEs 202 connected by one, two or more optical fibers 204.

As will be appreciated by those of ordinary skill in the art, OSC NEs 202 are not "visible" to SONET NEs 102 (FIG. 1). The purpose of FIG. 1 is provide an overview of an optical network 100 and the inclusion of both SONET NEs 102 (which are more common and more commonly appreciated) and the OSC NEs 202. The embodiment of the maintenance tool described herein is adapted to assist in the maintenance and analysis of a portion of optical network 100, namely the OSC optical links 108.

Figure 3:
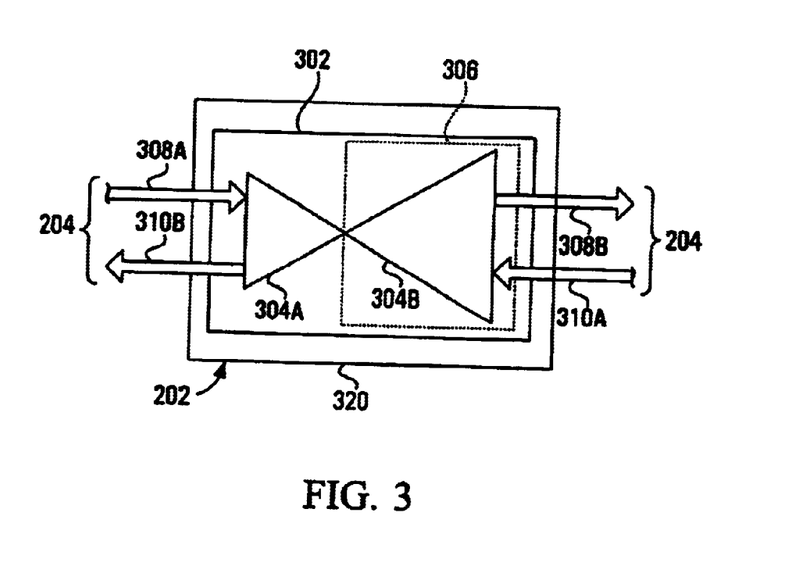
FIG. 3 is a schematic illustration of a portion FIG. 2.

Referencing FIGS. 2 and 3, an OSC NE 202 includes a circuit pack group (CPG) 320 which receives optical signals from optical fibers 204. A CPG 310 receives optical signals from an optical fiber 204, amplifies and conditions received signals, and re-transmits these optical signals on an optical fiber 204. Each optical fiber 204 is used for bi-directional communication. Consequently, two bands of optical signals—a red band (having wavelengths of approximately 1547.50–1561.00 nm) and a blue band (having wavelengths of approximately 1527.50–1542.50 nm)—are transmitted on each optical fiber 204. As will be appreciated by those of ordinary skill in the art, an OSC NE 202 may be configured as a terminating end of an optical link 108 (such as OSC NEs 202A and 202D) or as a Mid-Span Access (MSA) element (such as OSC NEs 202B and 202C). Accordingly, a single OSC NE 202 may communicate with an adjacent OSC NEs 202 using one, two or more optical fibers 204.

A CPG 320 receives incoming optical signals from the red band 308A and in the blue band 310A. Received optical signals 308A and 310A are amplified by amplifiers 304A and 304B, respectively. For bi-directional optical fibers 204 using more than one waveband, these amplifiers are sometimes known in the art as Multi-wavelength Optical Repeaters (MORs). A CPG 320 may provide additional signal conditioning. The type of signal conditioning provided is configurable and is known in the art as the facility 306 of the CPG 320.

Once a received red or blue band optical signal 308A, 310A has been amplified and (possibly) conditioned, the output red and blue band optical signals are output as red band output signals 308B and blue band output signals 310B.

As will be appreciated by those of ordinary skill in the art, OSC NEs 202 can, and often are, configured to collect data (e.g., statistics and other information) regarding the optical signals (red and blue bands) received, amplified (and, possibly, conditioned) and output on optical fibers 204. In the preferred embodiment, each OSC NE 202 will maintain records or data relating to communication with other OSC NEs 202 forming part of an optical link 108 (e.g., the identities of other OSC NEs, optical fiber performance, etc.). Additionally, each OSC NEs 202 will also preferably be suitably configured or modified to enable retrieval of the records maintained.

Embodiments of the invention include conventional OSC NEs 202 preferably modified to communicate with computer terminal 110 over network 112 as described herein. However, if OSC NEs 202 are not configured to communicate remotely with computer terminal 110, each OSC NEs 202 should be configured to enable retrieval of records maintained through other methods (e.g., serial link communication).

Figure 4A:
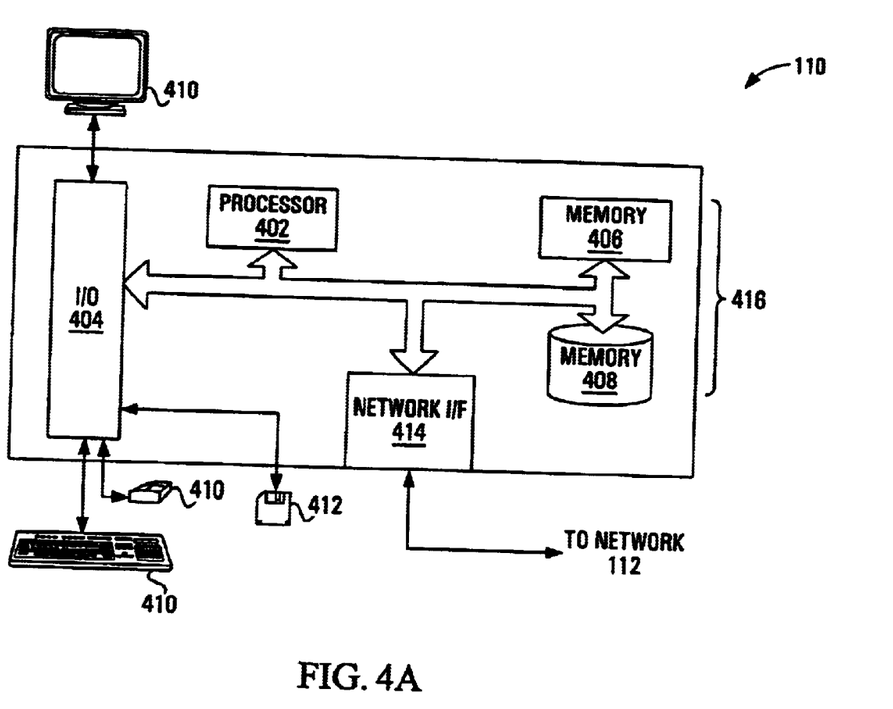
FIG. 4A is exemplary of further aspects of the computer terminal illustrated in FIG. 4.
Figure 4B:
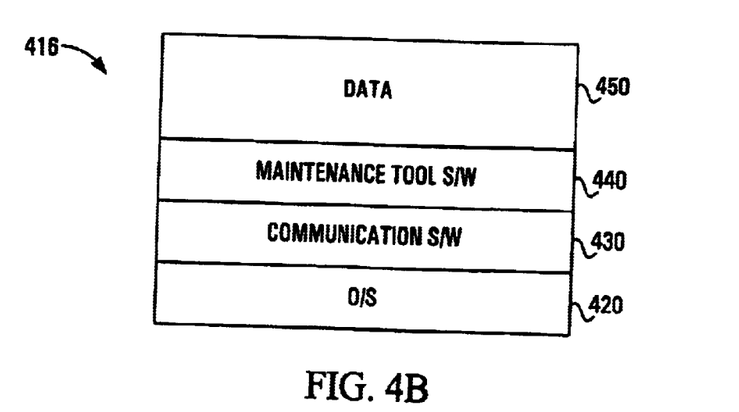
FIG. 4 is a exemplary of computer terminal embodying further aspects of the invention, the computer terminal communicating with portion of the optical network of FIG. 1.

Computer terminal 110, an embodiment of which is illustrated in FIG. 4, includes a processor 110 in communication, via a suitable bus, with input/output (I/O) card 404, memory 416 and network interface (I/F) 414. Memory 416 may include both volatile memory 406 and persistent memory or storage 408.

Processor 110 is a central processing unit (CPU) and associated chip set suitable to perform the operations attributed to computer terminal 110 described herein. For example, processor 402 may be implemented using a conventional processor such as Intel Pentium-class processor, reduced instruction set computer (RISC) chip or the like. Additionally, and as will be appreciated by those of ordinary skill in the art, one or more CPUs may be employed in alternative embodiments. Memory 406 may include conventional RAM, ROM, FLASH and other similar suitable storage devices for storing computer instructions, code and temporary data registers. Persistent storage 408 may include both internal and external storage devices such as fixed or hard disk drives, ZIP™ disks, optical storage devices (e.g., DVD-RAM, RW-CD, etc.) and the like. Memory 406 and persistent storage 408, in part or in whole, operate as a computer readable medium for the storage and retrieval of computer instructions and codes which adapt processor 402 to perform the functions and operations described herein.

Network I/F 414 enables communication between computer terminal 110 and other networking devices (e.g., OSC NEs 202) over a suitable network connection such as network 112 (FIG. 1). In the exemplary embodiment, network I/F 414 is a modem, Ethernet card or other suitable device for enabling communication with network 112 (FIG. 1). Alternatively, computer terminal 110 may communicate with other networking devices directly over a suitable link such as an RS-232 cable. In such an embodiment, network I/F 414 may be embodied in a serial port.

I/O card 404 provides a suitable interface between a user and computer terminal 110 and enables computer terminal 110 to receive computer instructions, code or the like. Accordingly, I/O card 404 communicates with input/output devices 410 which may include a keyboard, a mouse, a display or the like. I/O card 404 may be adapted to receive user instructions in the form of keyboard entries or mouse clicks indicative of user selections. Additionally, I/O card 404 provides an interface between computer terminal 110 and an external computer readable medium 412 which may be embodied in a diskette, CD-ROM or the like.

Memory 416 is illustrated schematically and in greater detail in FIG. 4A. As will be appreciated by those of ordinary skill in the art, the functional delineations illustrated in FIG. 4A may be altered and functions combined or separated as required. Memory 416, which may include both volatile and persistent memory 406, 408, includes an operating system (O/S) 420, communication software (S/W) 430, maintenance tool S/W 440 and a data portion 450.

O/S 420 may be implemented using a conventional operating system such as, for example, Microsoft™ Windows™ 98, 2000 ME, NT, Linux, Unix or the like.

Communication S/W 430 operates in conjunction with O/S 420 and maintenance tool 440 to enable communication between computer terminal 110 (FIGS. 1 and 4) and OSC NEs 202 through network 112 or, in an alternative embodiment, through direct serial communication. In the illustrated embodiment, communication S/W 430 operates to utilize the hardware facilities of network I/F 414. Accordingly, communication S/W 430 in the illustrated embodiment may include known communication protocols such as the telnet, Ethernet or Internet protocols. Additionally or alternatively, communication S/W 430 may include software to operate a modem.

Figure 7:
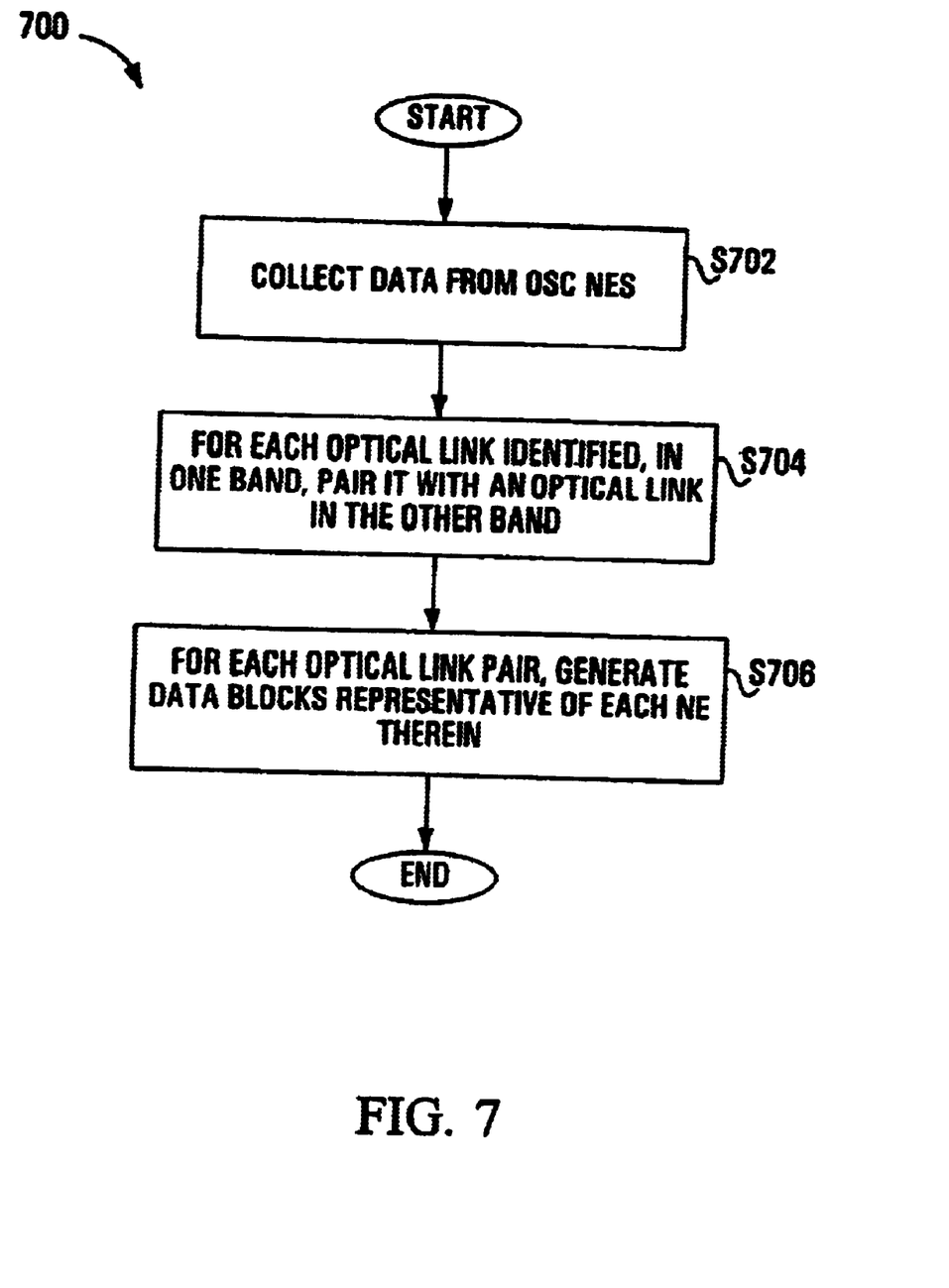
FIG. 7 is a flow chart of operations performed by the computer terminal of FIG. 4.
Figure 8:
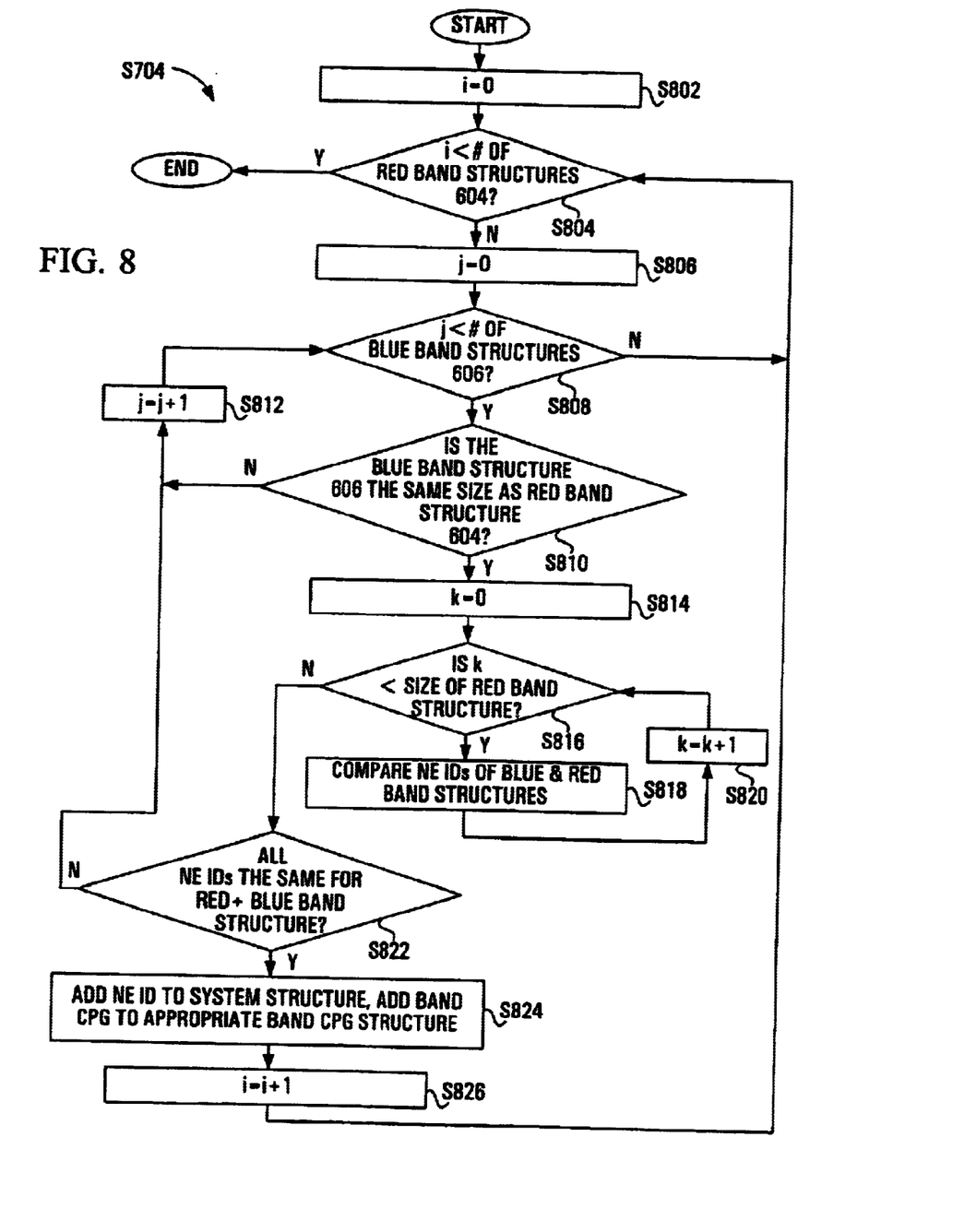
FIG. 8 is a more detailed flow chart of a portion of the operations illustrated in FIG. 5.

Maintenance tool 440 is, in the exemplary embodiment, software instructions or codes which, when retrieved from memory 416 and executed by processor 402 adapt processor 402 to perform the functions described herein including those illustrated as flow charts in FIGS. 7–8.

In FIGS. 7 and 8 (with reference to FIGS. 4, 4A, 5 and 6) maintenance tool 440 adapts processor 402 to perform operations 700. Hereinafter description of the exemplary embodiment will refer to operations and functions performed by maintenance tool 440. While it is more accurate to indicate that the computer readable instructions or codes (illustrated in flow charts of FIGS. 7 and 8) which form maintenance tool 440 are retrieved from memory 416 and executed by processor 402 thus adapting processor 402 to perform these functions, to be more concise these operations and functions will be attributed directly to maintenance tool 440.

During operations 700, maintenance tool 440 will operate to communicate with and collect data from each OSC NE 202 that forms part of optical network 100 (FIG. 1). Communication between maintenance tool 440 and an OSC NE 202 is facilitated through operation of communication S/W 430 and network I/F 414. Communication between maintenance tool 440 and the OSC NEs 202 may be conducted in a serial or parallel manner. That is, maintenance tool 440 may first communicate with and collect data from a first OSC NE 202. Subsequent to communication with a first OSC NE 202, maintenance tool 440 may then repeat the communication and collection with a second OSC NE 202. This communication and collection may then be repeated as necessary. Alternatively, maintenance tool 440 may communicate with and collect data from more than one OSC NE 202 simultaneously or contemporaneously (i.e., in parallel). In the exemplary embodiment, maintenance tool 440 operates to communicate with and collect data from a plurality of OSC NEs 202 serially.

Regardless of the communication protocols used to establish communication or whether communication with OSC NEs 202 is established in a serial or parallel fashion, data is collected from each OSC NE 202 (S702). The data collected from each OSC NE 202 is used by maintenance tool 440 to determine the identity of each OSC NE 202 in a single band (i.e., red or blue band) forming part of a single optical link 108. Once the identities of the OSC NEs 202 for a single optical link 108 are determined, maintenance tool 440 uses this identity information to associate information related to the red band of a single optical link 108 with the information related to the corresponding blue band thus forming an "optical link pair" (S704). Using the information of the optical link pair, maintenance tool 440 forms a map or detailed description of the entire optical link 108 which can then be presented to a user (S706).

As described above, data used, in part, by maintenance tool 440 to generate a detailed map of optical links in optical network 100 is collected from individual OSC NEs 202. The data or information collected is, in the exemplary embodiment, data that is typically generated and stored by each OSC NEs 202 for various other purposes. Accordingly, in one aspect of the present invention, data required by maintenance tool 440 can be accessed using conventional tools. For example, in optical networks employing OSC NEs from Nortel Networks Ltd. of Brampton, Canada, data required by maintenance tool 440 can be accessed by using a tool known as the Multi-wavelength Optical Repeater Facility (MORF) software. As will be appreciated by those of ordinary skill in the art, other software from other suppliers of OSC NEs or custom software could be employed to retrieve similar data from OSC NEs. However, in the embodiments described herein, reference will be made to the MORF software which forms part of or is used by maintenance tool 440.

Using a list of the network addresses, network IDs or physical locations of the individual OSC NEs 202 (which may be manually provisioned into memory 416 of computer terminal 110—FIG. 4), maintenance tool 440 will establish communication with each OSC NE 202 (S702). During communication, maintenance tool 440, through utilization of the MORF software (or other suitable software), will query and retrieve data records maintained by each NE 202. The data retrieved from an OSC NE 202 will generally include, but not be limited to, data 500 illustrated in FIG. 5.

Figure 5:
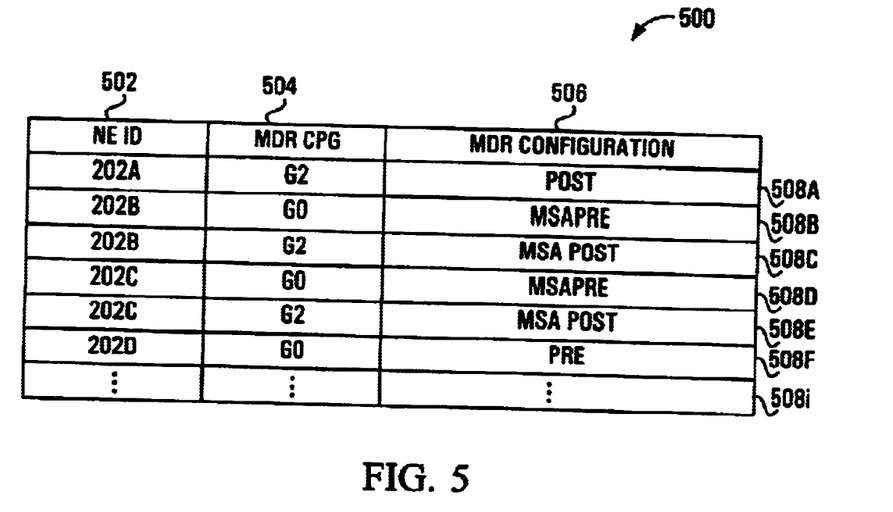
FIG. 5 is exemplary of data output resulting from communications between the computer terminal of FIG. 4 and network elements of FIG. 2.

Data for fields 502, 504 and 506 can be obtained using the MORF software with the following command lines: "morf pwrm disptr g0 red" (which generates data 500 for the red band) and "morf pwrm disptr g0 blue" (which generates data 500 for the blue band).

Data 500 includes information or indicia pertaining to the identity 502 (e.g., NE ID) of each OSC NE 202 with which the queried NE has communicated, the identity of the CPG 504 corresponding to each identified NE and the configuration 506 of the amplifier (or MOR). Rows of data 508 (having data fields NE ID 502, MOR CPG 504 and MOR configuration 506) are retrieved from each OSC NE 202 forming part of optical network 100 (FIG. 1). Since a single OSC NE 202 may operate as a mutli-span access unit, a single OSC NE 202, in a non-redundant optical link (i.e., an optical link with only one optical fiber connecting adjacent NEs), may service more than one optical fiber 204. Consequently, a single OSC NE 202 may be identified twice in data 500 retrieved from a single OSC NE 202—once for each optical fiber 204 serviced. For those NEs listed twice in data field 502 of data 500, one amplifier 304 (FIG. 3) will be configured as an MSA pre-amplifier (MSAPre) and the other amplifier 304 will be configured as an MSA post-amplifier (MSAPost) in column 506.

As will be explained below, other data, in addition to that collected from fields 502, 504 and 506, will also be collected from each OSC NE 202 and stored for later processing in memory 416. This data can be obtained through the MORF software using the following command lines: "morf pwrm disptp g0 red" (which returns data relating to power measurements and, more particularly to input red power, reflected blue power, input OSC power, total input power, output red power, output OSC power, total output power, input LOS threshold and input shut-off threshold) and "morf pwrm disptp g0 blue" (which returns similar data for the blue band). Other calls to the MORF software may be made to collect additional data from the queried OSC NE 202. These calls may include, for example, "morf pwrm dispor g2 red" or "morf pwrm dispor g2 blue" (each of which returns data relating to output optical return loss, optical return loss threshold and optical reflectometer state relating to the specified color band); "morf sig qrgp G0 red" and "morf sig qrgp g0 blue" (each of which returns data relating to amplifier configuration, fiber type, power control mode, input shut-off mode, color band output optical reflectometer, total output power target, peak output power target, input LOS threshold, input shut-off threshold, optical return loss threshold, mid-stage access partner and output power lock for the respective color band); and "morf sig disptp" (which returns data relating to output optical return loss).

Since an OSC NE 202 will only communicate with other OSC NEs 202 forming part of the same optical link 108, maintenance tool 440, having retrieved data 500 from each OSC NE 202 forming at least part of optical network 100 (FIG. 1), collates the data collected to determine the OSC NE members of optical links 108 for each band (red or blue). This collation may be performed by selecting one OSC NE 202 of an optical link 108. For the selected OSC NE 202, data 500 retrieved will identify one or more (and usually all) members of its optical link 108. By accessing similar data for each of these members identified in data 500 (and the data 500 retrieved from those OSC NEs 202 identified by the data from the selected OSC NE and so on), a complete listing of the members of a single optical link 108 can be generated. Accordingly, a listing 600 (FIG. 6) of each OSC NE 202 forming optical links 108 can be generated. This process can then be repeated for other OCS NEs 202 forming other optical links 108.

Figure 6:
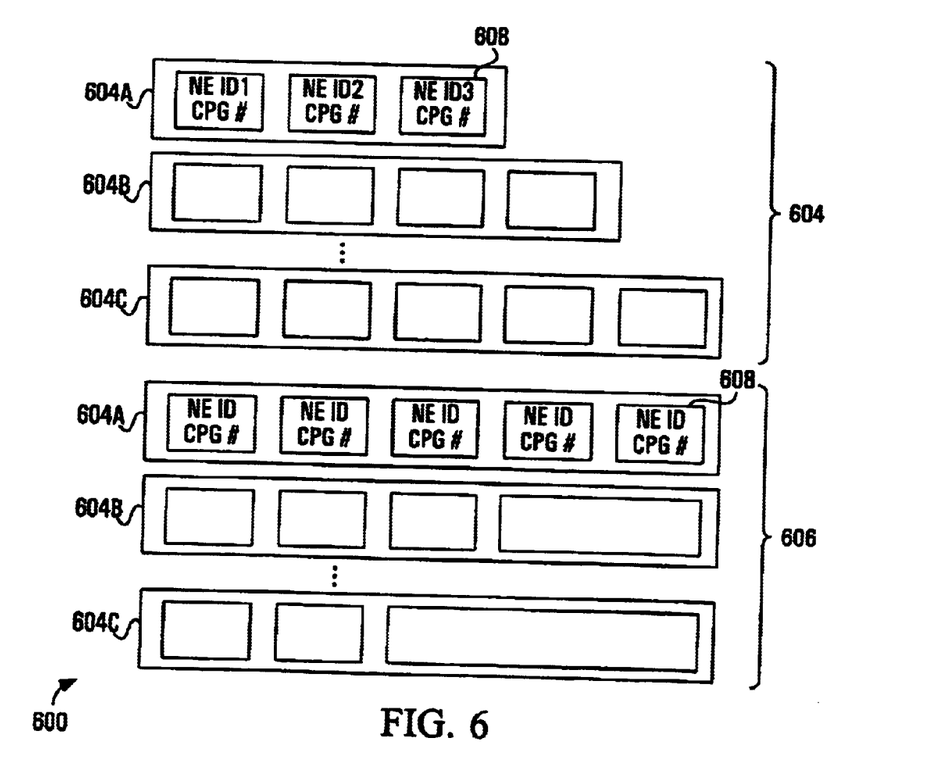
FIG. 6 is a schematic of a mapping of optical network of FIG. 1 performed by the computer terminal of FIG. 4.

It should be noted that listing 600 provides an excellent cross-check against the initial listing of addresses OSC NEs 202 forming optical network 100. If, for whatever reason, modifications or alterations to optical network 100 (and, more particularly, the OSC portion) have been made without updating the initial listing of OSC NE 202 addresses used by maintenance tool 440, listing 600 can identify this problem. As described above, listing 600 will be generated from records maintained by each OSC NE 202. These records include the NE ID of other OSC NEs which have communicated with the selected OSC NE. Accordingly, the records used to generate listing 600 may include NE IDs which did not form part of the initial listing but which identify NEs which have communicated with a selected OSC NE 202. Any discrepancy between the initial listing and listing 600 will, in some embodiments, result in maintenance tool 440 updating the initial listing for future reference; contacting any OSC NE 202 missing from the initial listing, and collecting any desired information. Alternatively, maintenance tool 440 may indicate the discrepancy to a user of maintenance tool 440 by way of message, alarm or the like.

Since the MORF software used by maintenance tool 440 is waveband specific, data corresponding to optical links 108 will be separated into data corresponding to the red band portion of optical links 108 (illustrated in FIG. 6 as red band optical link data structures 604—a data structure representing three red band optical links are illustrated as data structures 604A, 604B and 604C) and the blue band portion of optical links 108 (illustrated in FIG. 6 as blue band optical link data structure 606—data structures representing three blue band optical links are illustrated as data structures 606A, 606B and 606C).

Each data structure 604, 606 will include data blocks 608, 610, respectively, corresponding to individual OSC NEs 202 which form part of an optical link 108. As will be appreciated, data structures 604, 606 may vary in the number of data blocks 608, 610 depending upon the number of OSC NEs 202 which form part of a corresponding optical link 108. For example, the red band data structure 604 corresponding to optical link 108A (FIG. 1) will include four data blocks 608—one for each of the four OSC NEs 202 illustrated. A similar number of data blocks 610 will be included in the blue band data structure 606 corresponding to optical link 108A. In contrast, the red and blue band data structures 604, 606 corresponding to optical link 108B will each include only three data blocks 608, 610, respectively. Accordingly, the size (i.e., the number of data blocks) in a selected data structure 604, 606 may differ from the size another data structure 604, 606.

A data structure for a single band portion of single optical link (e.g., 604A or 606A) will initially include a data block 608, 610 representing the OSC NE ID (from field 502—FIG. 5) and the MOR CPG number (from field 504—FIG. 5). In combination these two fields of data will uniquely identify one amplifier 304 (FIG. 3) of a single OSC NE 202 (FIG. 2).

In addition to generating data blocks 608, 610 and arranging these data blocks in data structures 604, 606 based on color band for each optical link 108, maintenance tool 440 arranges for the data blocks 608, 610 of data structures 604, 606 to be organized in an order which mimics or corresponds to the physical layout of the corresponding optical link 108. Structures 604, 606 are arranged based on the data received from the "morf pwrm disptr g0 red" and "morf pwrm disptr g0 blue" commands.

Once the red and blue band optical link data structures 604, 606 have been generated and the data blocks 608, 610 contained therein are organized to mimic the physical layout of a corresponding optical link 108, maintenance tool 440 performs operation S704 (FIG. 7) to associate the two band data structures 604, 606 which form a single optical link 108. Operation S704 is illustrated in greater detail in the flow chart of FIG. 8.

Operation S704 is performed by maintenance tool 440 once for each red band optical link data structure 604 generated in S702. Accordingly, and in the exemplary embodiment, a loop (S804–S826), having a counter (i) set to zero (S802) that is incremented by one for each pass through the loop (S826), is performed for each band optical link data structure 604. Once the value of "i" exceeds the number of red band data structures (S804), operations S704 terminate.

For each $i^{th}$ red band data structure 604, a second loop (S808–824) is performed. The second loop is performed at most once for each blue band data structure 606 by using a second counter "j". Like the first loop, the second loop terminates once the counter "j" has exceeded the number of blue band data structures 606 (S808). The second loop may also terminate early (i.e., prior to counter "j" exceeding the number of blue band data structures 604) if a blue band data structure 606 is identified which corresponds to the $i^{th}$ red band data structure 604 (S824). If, during a pass through the second loop, maintenance tool 440 determines that the $j^{th}$ blue band data structure 606 is the same size (i.e., has the same number of data blocks 610) as the $i^{th}$ red band data structure 604 (S810), a third loop (S816–822) is performed using a counter "k". If, however, the size of the $j^{th}$ blue band data structure 606 is different from the size of the $i^{th}$ red band data structure 604, counter "j" is incremented (S812) and the second loop repeats until a blue band data structure 606 having the same size as the $i^{th}$ red band data structure 604 is identified.

If the $j^{th}$ blue band data structure 606 is the same size as red band data structure 604, the third loop (S816–822) is performed once for each $k^{th}$ data block 608, 610 in the corresponding data structures 604, 606. During the third loop, the OSC NE IDs and the CPGs (which were previously retrieved in S702—FIG. 7) for each data block are compared. If, for each $k^{th}$ data block 608 in the $i^{th}$ red band data structure 604, there exists a data block 610 in the identified $j^{th}$ blue band data structure 606 which has the same NE ID and CPG (S822), then the two data structures 604, 606 are associated with each other since both data structures refer to the same optical link 108 (S824). In this circumstance, the second and third loops terminate, the counter "i" is incremented by one (S826) and the first, second and third loops repeat for the remaining red band data structures 604.

As a consequence of operation S704 and, more particularly operations S802–S828, for each optical link 108, which transmits red and blue band data signals, the corresponding one red band data structure 604 and corresponding one blue band data structure 606 of a single optical link 108 will be associated with each other.

However, and as indicated above, in some optical networks redundant optical fibers are sometimes used to provide additional security and availability. In such a redundant optical network, adjacent pairs of OSC NEs 202 communicate via two (or more) optical fibers 204. As a result of this redundancy, a single optical link 108 may be associated with more than one pair of corresponding red and blue band data structures 604, 606 (i.e., for a single redundant system which has two optical fibers 204 connecting adjacent pairs of OSC NEs 202, there would be two pairs of red and blue band data structures 604, 606). Accordingly, in some embodiments of the present invention, it may be desirable to associate all pairs of red and blue band optical structures for the same optical link 108. The association of all pairs of red and blue band optical structures for the same optical link 108 may be enabled by using an algorithm similar to that illustrated in FIG. 8.

As indicated above, in addition to the NE ID, CPG number and MOR configuration data collected from fields 502, 504 and 506 (FIG. 5), other data is also collected by maintenance tool 440 and stored in memory 416 of computer terminal 110. This stored data, previously unused, is used to populate each of data blocks 408, 410 with performance and configuration data for each OSC NE 202 associated with data blocks 408, 410 (S706).

If desired, the data blocks 408, 410 can then be output to a user in a desired format. This may, for example, include displaying the results in textual or graphical form on output device 110 (FIG. 1)(e.g., a display or printing device), outputting the data to a computer readable format such as memory 416, medium 412 (FIG. 4) or the like. For example, a graphical representation of the individual links may be presented on a display by I/O card 404 (FIG. 4). By passing a pointer (through use of a mouse) over any graphical representation of an OSC NE 202, a user may be presented with a "pop-up" message box containing all or some of the performance and maintenance statistics relating to the selected OSC NE. Alternatively, output to memory 416 or medium 412 may be provided in a format that is readable by other computer applications such as Microsoft™ Excel™. In this latter instance, a comma or tab delimited format may be preferred.

As will be appreciated by those of ordinary skill in the art, an optical network is provided which includes a tool (e.g., maintenance tool 440) which enables simple, remote and easy to use analysis of portions of the optical network. Embodiments of the invention are estimated to provide significant cost and time savings over known maintenance and analysis methods. Additionally, embodiments of the present invention reduce the errors (as compared the manual system), timely responses to maintenance and analysis and, additionally, requires relatively little user skills or involvement.

While one (or more) embodiment(s) of this invention has been illustrated in the accompanying drawings and described above, it will be evident to those skilled in the art that changes and modifications may be made therein without departing from the invention. All such modifications or variations are believed to be within the scope of the invention as defined by the claims appended hereto.

What is claimed is:

1. A method of mapping an optical network, said optical network comprising a plurality of network elements (NEs), some adjacent pairs of NEs of said plurality of NEs communicating using optical fibers, one or more of said some adjacent pairs forming one or more optical links, said method comprising:

collecting from each one of a plurality of NEs data relating to communication with one or more other NEs maintained by said each NE;

identifying, based on data collected from said plurality of NEs, NEs which, together with optical fibers therebetween, form an optical link;

generating a map or data structure representing the physical layout of said optical link based on data collected from one or more of said identified NEs.

2. The method of mapping of claim 1 further comprising: correlating said identified NEs with a list of NEs intended to represent NEs for said optical link.

3. The method of mapping of claim 1 wherein said data relating to communication comprises performance indicia of said identified NEs.

4. The method of mapping of claim 1 wherein said collecting comprises:

for a selected NE, retrieving data identifying NEs in communication with said selected NE.

5. The method of mapping of claim 4 wherein said retrieving comprises:

through communication with said selected NE and said NEs in communication with said selected NE, retrieving identity data corresponding to the identity and configuration of said NEs with which said selected NE communicates.

6. The method of mapping of claim 5 wherein said identity data is retrieved using networked communication.

7. The method of mapping of claim 6 wherein said identity data retrieved corresponds to wavebands used by said selected NE and said NEs in communication with said selected NE.

8. The method of mapping of claim 7 wherein said generating comprises:

for each one of said wavebands used by said identified NEs forming a waveband specific data structure corresponding to said optical link in said each waveband, said waveband specific data structure comprising a data block for each one of said identified NEs;

associating data structures formed for said optical link in different ones of said wavebands with each other; and populating said data blocks of said associated data structures with data collected from said identified NEs.

9. The method of mapping of claim 8 wherein said wavebands comprise a red waveband and a blue waveband.

10. The method of mapping of claim 8 further comprising: displaying a graphical representation of said optical link, said graphical representation corresponding to said data blocks and data structures.

11. A method for facilitating management of an optical network, comprising:

over a network, receiving from each one of a plurality of network elements (NEs) identification information identifying said each NE and one or more other NEs with which said each NE communicates; and correcting said identification to identify NEs communicating over an optical link.

12. The method of claim 11 further comprising:

ordering said identification information for each one of said identified NEs communicating over said optical link in an order paralleling an order of said identified NEs communicating over said optical link in said optical network.

13. The method of claim 12 wherein said correlating comprises correlating red band and blue band information for one of said NEs.

14. The method of claim 13 wherein said correlating comprises first correlating said identification information to identify said identified NEs communicating over said optical link using one of a red band and a blue band.

15. The method of claim 14 wherein said correlating comprises second correlating said identification information to identify said identified NEs communicating over said optical link using another of said red band and said blue band.

16. The method of claim 15 wherein said correlating further comprises associating said identified NEs communicating over said optical link using said one band with said identified NEs communicating over said optical link using said another band.

17. The method of claim 16 wherein said associating comprises determining a first number of said identified NEs using said one band and a second number of said identified NEs using said another band and comparing said first number and said second number.

18. A computer readable medium storing instructions for directing a processor to map a portion of an optical network, said instructions directing said processor to:

collect from each one of a plurality of network elements (NEs) data relating to communication with one or more other NEs maintained by said each NE;

identify, based on data collected from said plurality of NEs, NEs which, together with optical fibers therebetween, form an optical link;

generate a map or data structure representing the physical layout of said optical link based on data collected from one or more of said identified NEs.

19. The computer readable medium of claim 18 wherein said data relating to communication comprises performance indicia of said identified NEs.

20. The computer readable medium of claim 18 wherein said instructions directing said processor to identify NEs comprises instructions directing said processor to:

for a selected NE, retrieve data identifying NEs in communication with said selected NE.

21. The computer readable medium of claim 20 wherein said instructions directing said processor to retrieve data identifying NEs in communication with said selected NE comprises instructions directing said processor to:

through communication with said selected NE and said NEs in communication with said selected NE, retrieve identity data corresponding to the identity and configuration of said NEs with which said selected NE communicates.

22. The computer readable medium of claim 21 wherein said identity data is retrieved using networked communication.

23. The computer readable medium of claim 22 wherein said identity data retrieved corresponds to wavebands used by said selected NE and said NEs in communication with said selected NE.

24. The computer readable medium of claim 23 wherein said instructions directing said processor to generate comprises instructions directing said processor to:

for each waveband used by said selected NE and said NEs in communication with said selected NE, form a waveband specific data structure corresponding to said optical link in said waveband, said waveband specific data structure comprising a data block for each of said selected NE and said NEs in communication with said selected NE;

associate data structures formed for said optical link in different wavebands with each other; and populate said data blocks of said data structures associated with said data retrieved from said selected NE and said NEs in communication with said selected NE.

25. The computer readable medium of claim 24 further comprising further instructions directing said processor to:

display a graphical representation of said optical link, said graphical representation corresponding to said data blocks and data structures.

26. An apparatus for generating a map of a portion of an optical network, said optical network comprising a plurality of network elements (NEs), some adjacent pairs of NEs of said plurality of NEs communicating using optical fibers, one or more of said some adjacent pairs forming one or more optical links, said apparatus comprising:

memory adapted to store computer readable instructions and code;

a network interface adapted to communicate with a data network;

a processor in communication with said memory and said network interface, said processor adapted to retrieve and execute said instructions and code from said memory adapting said processor to:

collect from each one of a plurality of network elements (NEs) data relating to communication with one or more other NEs maintained by said each NE:

identify, based on data collected from said plurality of NEs, NEs which, together with optical fibers therebetween, form an optical link; and generate a map or data structure representing the physical layout of said optical link based on data collected from one or more of said identified NEs.

27. The apparatus of claim 26 wherein said data relating to communication comprises performance indicia of said identified NEs.

* * * * *